United States Patent Office 3,264,678
Patented August 9, 1966

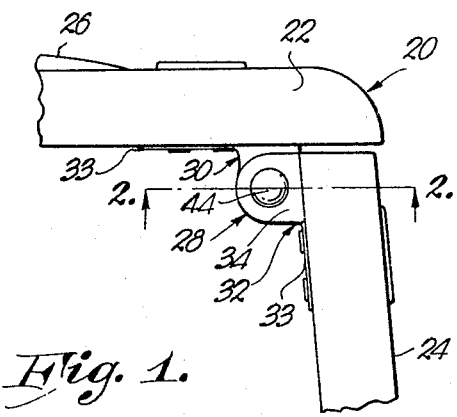
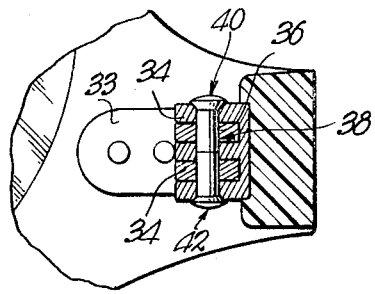
Fig. 1.
Fig. 2.
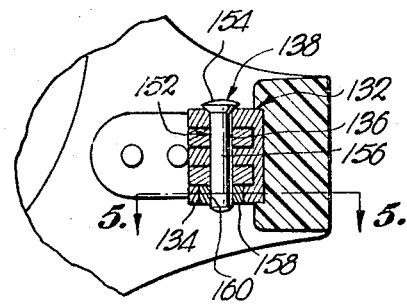
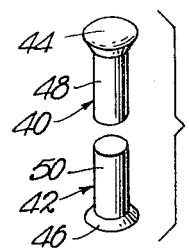
Fig. 4.
Fig. 3.
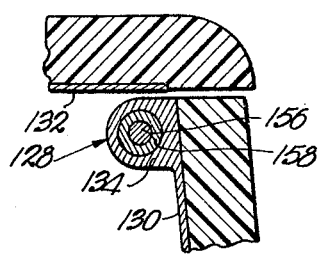
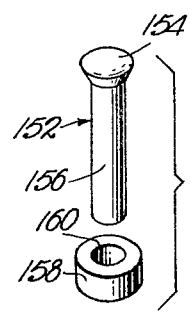
Fig. 5.
Fig. 6.
INVENTOR.
Alfred F. Parmelee
BY
Hovey, Schmidt, Johnson & Hovey
ATTORNEYS.

3,264,678
MAGNETIC HINGE PIN ASSEMBLY FOR
EYEGLASS STRUCTURE
Alfred F. Parmelee, 5801 W. 83rd St.,
Overland Park, Kans.
Filed Oct. 4, 1965, Ser. No. 496,239
6 Claims. (Cl. 16—128)

This is continuation-in-part of my copending application Serial No. 299,876, now abandoned, filed August 5, 1963, and entitled "Magnetic Hinge Pin Assembly for Hinge Structure."

This invention relates to a novel magnetic hinge pin assembly for use in eyeglass frames and, more particularly, to the use of novel magnetic structure to maintain the hinge pin in proper position in the hinge structure.

Heretofore, hinge pins for use in eyeglass frame applications have been in the nature of a small screw that, with the aid of a small screwdriver, could be threaded into a bore through the hinge structure to provide pivot means between the eyeglass frame and the bow. In time, and after repeated opening and closing of the hinge, the screw tended to loosen and work its way out of the bore, causing the frame and bow to separate, resulting in irritation to the wearer. The screw was often lost because of its small size or, if found, difficult to replace by the eyeglass wearer, and necessitating return of the eyeglasses to an optometrist or oculist for repair.

The problem was often solved by extending the screw beyond the bore and knurling that portion that extended beyond the bore. This generally prevented the screw from working out of the bore; however, it also made subsequent manual removal of the screw difficult should the need arise to remove the frame from the bow. In many instances, the screwdriver slot on the head of the screw became stripped, making the removal by means of a screwdriver very difficult if not impossible.

Therefore, it is the primary object of the present invention to overcome the problems associated with use of a threaded member as an eyeglass hinge pin by provision of hinge pin structure for eyeglasses wherein the structure has magnetic properties to thereby maintain the hinge pin in proper position within the hinge pin passage.

The relatively small size associated with eyeglass hinge pins presents unique problems since, from an economical and practical standpoint, small pins must be manufactured as integral units rather than, for example, providing a magnetic head on the pin for attraction to a hinge structure constructed of magnetic material. Additionally, hinge structures for eyeglasses are generally made of nonmagnetic materials such as copper-zinc alloys to guard against corrosion, and thus a pin could not be held by magnetic attraction to the hinge structure.

Therefore, it is a very important object of the present invention to provide a hinge pin assembly which has novel magnetic properties to particularly adapt the assembly for use in eyeglass frames, and more specifically, to overcome the disadvantages resulting from the inherent small sizes of the elements of the assembly and also the nonmagnetic properties of the hinge structure.

Yet another object of this invention is to provide a magnetic hinge pin for eyeglasses as above described wherein the pin is a monolithic element magnetized in a manner whereby the pin will be magnetically attracted longitudinally through the pin passage of the hinge structure to assure optimum retention of the pin and thereby prevent accidental loss of the same.

It is an aim of the instant invention to provide a hinge pin structure that will not work out of its proper position during repeated use of the hinge.

It is a further aim to provide a hinge pin structure that can be easily and readily inserted or removed from a hinge assembly. In this respect, it is an object of the invention to provide hinge pin structure for an eyeglass frame which overcomes all of the problems associated with a screw which may be made and sold at approximately the same or a lower price.

In the drawings:
FIGURE 1 is a fragmentary plan view illustrating one side of an eyeglass comprising a frame, lens bow, and a hinge assembly;
FIG. 2 is a cross-sectional view through FIG. 1 at line 2—2 and showing the pivot structure of the hinge assembly in greater detail;
FIG. 3 is an enlarged, perspective, exploded view of the two segments of the pivot structure;
FIG. 4 is a cross-sectional view similar to FIG. 2 but showing modified magnetic pivot structure for the hinge assembly and comprising a pin and collar;
FIG. 5 is a cross-sectional view of the modified pivot structure taken on line 5—5 of FIG. 4; and
FIG. 6 is an enlarged, perspective, exploded view of the modified pivot structure illustrated in FIG. 4.

Eyeglass structure, as shown in FIG. 1, and broadly designated 20, conventionally comprises a lens frame 22, a bow 24, a lens 26 and a hinge assembly broadly numbered 28. Hinge assembly 28, often constructed of a copper-zinc alloy, has a pair of relatively movable hinge structures 30 and 32 each having a strap 33 fixedly attached by means known in the art to frame 22 and bow 24 respectively. Hinge structures 30 and 32 each have interengageable leaves 34 integral with alternate structures. Each leaf 34 has a bore therethrough which cooperates to define an elongated pivot passage 36 when the leaves 34 are positioned in interengaged relationship as shown in FIGS. 2 and 4. Pivot structure 38 extends through passage 36 for maintaining the hinge structures 30 and 32 in proper relationship while permitting free relative rotation therebetween.

The preferred pivot structure which is designated 38 comprises a monolithic pivot pin section 40 and an identical monolithic member or section 42 as shown in FIG. 3, which have enlarged, generally conical heads 44 and 46 respectively integral with corresponding cylindrical shafts 48 and 50.

The axially aligned bores through leaves 34 are of equal diameter to form the common pivot passage 36. Section 40 of pivot structure 38 telescopes into pivot passage 36 from one direction while section 42 telescopes into the passage 36 from the opposite direction. The conical heads 44 and 46 of sections 40 and 42, serving as means to maintain the sections in telescoped position, are preferably received in suitable complemental depressions therefor in the outer, opposed surfaces of the end leaves 34 and shaft 48 of section 40 is positioned in end-to-end abutting relationship to shaft 50 of section 42.

The elongated pivot sections 40 and 42 in the preferred embodiment of the invention are magnetized Alnico with opposite magnetic poles at the ends thereof to define magnetic axes coincident with the longitudinal axes of the respective sections. The adjacent, abutting extremities of shafts 48 and 50 are of opposite polarity. The magnetic attraction between the opposite poles of the two sections 40 and 42 exerts a longitudinal force on the sections to draw them into passage 36 and thereby retains the pivot sections in tight interengagement within pivot passage 36 to maintain the hinge structures 30 and 32 in proper alignment.

Much the same result will be accomplished by having one section 40 magnetized, and the other section 42 being of non-magnetized magnetic metal so that it is attracted to section 40 to effect retention of the pivot sections within passage 36. This, however, will not result in the double strength pull of two magnetic sections as described above.

FIGURE 6 illustrates a modified pivot structure 138 comprising an elongated monolithic pin section 152 having a conical head 154 and a cylindrical shaft 156 integral therewith. A collar or member 158 is adapted to receive the end of shaft 156 of pin 152 in telescoping relationship, and is carried by an end leaf 134 of hinge structure 132 as shown in FIG. 4. The central aperture 160 in collar 158 is in coaxial alignment with passage 136 through hinge structures 130 and 132 of hinge assembly 128. In the preferred construction, section 152 and collar 158 are both constructed of magnetized Alnico although it is to be understood that only one of the members need be magnetic while the other member is of magnetic material. The elongated pin section 152 and collar 158 of structure 138 are cooperable to magnetically attract pin 152 longitudinally through passage 136 and thereby maintain pin 152 in proper disposition during extended use of the hinge.

Having thus described the invention, what is claimed as new and desired to be secured by Letters Patent is:

1. A hinge assembly for eyeglasses having a frame and bows thereon, comprising:
   a pair of relatively movable hinge structures for swingably interconnecting the frame and a respective bow and having a common pin-receiving pivot passage therethrough; and
   hinge pin means provided with an elongated first section having one end thereof telescoped at least partially through said passage, and a second section contacting said one end of said first section, one of said sections being magnetic and the other section being magnetized whereby said sections will be magnetically coupled to each other, said sections including integral retainer means disposed to engage at least one of said hinge structures and normally maintain said first section in said telescoped position.

2. A hinge assembly for eyeglasses having a frame and bows thereon, comprising:
   a pair of relatively movable hinge structures for swingably interconnecting the frame and a respective bow and having a common pin-receiving pivot passage therethrough; and
   hinge pin means provided with an elongated magnetized pivot pin having magnetic poles at the opposed ends thereof to define a magnetic axis coincident with the longitudinal axis of said pin, one end of said pin being telescoped at least partially through said passage, and a magnetic member contacting said one end of the pin and retained thereon by magnetic attraction of said member to said one end, said member and said pin including integral retaining means disposed to engage at least one of said hinge structures and normally maintain the pin in said telescoped position.

3. An assembly as set forth in claim 2, wherein the portion of said member contacting said pin is magnetized to have a polarity opposite to said one end of the pin.

4. An assembly as set forth in claim 2, wherein said pin comprises a monolithic section having an enlarged head and a shank, said shank telescoping through said passage and extending outwardly therefrom, said member comprising a collar receiving said shank in telescoped relationship thereto at the extremity of said pin opposite the head thereof.

5. An assembly as set forth in claim 2, wherein said member and pin each comprise an elongated monolithic section having an enlarged head defining said maintaining means and a thinner shank portion, said pin telescoped in one direction through said passage with the head thereon engaging a proximal outer surface of said hinge structures, the member telescoping in the opposite direction through said pivot passage with proximal extremities of the sections in abutting relationship and the head of said member engaging a proximal outer surface of said hinge structures.

6. An assembly as set forth in claim 5, wherein said member is magnetized to form magnetic poles at the opposed ends thereof to define a magnetic axis coincident with the longitudinal axis of the member, and said abutting extremities are of opposite polarity.

References Cited by the Examiner

UNITED STATES PATENTS

| 84,771 | 12/1868 | Shannon | 16—168 |
| 986,492 | 3/1911 | Murdock | 24—201.2 X |
| 1,476,797 | 12/1923 | Carlin | 16—149 |
| 2,226,287 | 12/1940 | Miller. | |
| 2,428,645 | 10/1947 | Bausch. | |
| 2,627,423 | 2/1953 | Copeman. | |
| 2,737,847 | 3/1956 | Tesauro. | |
| 2,812,203 | 11/1957 | Scholten. | |
| 2,962,317 | 11/1960 | Morse | 151—37 X |
| 3,013,297 | 12/1961 | Ferry | 16—169 |
| 3,022,957 | 2/1962 | Blunt et al. | 292—251.5 X |
| 3,141,216 | 7/1964 | Brett | 24—201.2 |

FOREIGN PATENTS

| 98,770 | 8/1961 | Netherlands. |

PATRICK A. CLIFFORD, *Primary Examiner.*
D. L. TROUTMAN, *Assistant Examiner.*